3,018,273
PROCESS OF POLYMERIZING HIGHER LACTAMS
John Mann Butler, Ross M. Hedrick, and Edward H. Mottus, Dayton, Ohio, assignors to Monsanto Chemical Company, St. Louis, Mo., a corporation of Delaware
No Drawing. Filed Apr. 21, 1958, Ser. No. 729,509
18 Claims. (Cl. 260—78)

This invention relates to the polymerization of cyclic amides and more particularly to an improved process for the polymerization of ε-caprolactam to useful polyamides which are suitable for the production of fibers, films, cast objects and the like.

Numerous polymerization processes have been suggested for the polymerization of cyclic amides. One method has been the hydrolytic process wherein the cyclic amide is heated at an elevated temperature of about 200–300° C. under superatmospheric pressure in the presence of not less than 0.1 mol and preferably from 1 to 4 mols, but less than 10 mols of water in an initial reaction and the polymerization is subsequently continued at atmospheric pressure or under a reduced pressure to remove the water and unreacted monomer (U.S. Patent No. 2,241,322). The hydrolytic process requires a relatively long period of time to effect a satisfactory degree of polymerization and thus is an expensive process for the commercial production of useful polymers. Another process for the catalytic conversion of cyclic amides into polyamides is by the two-stage reaction of the cyclic amide in the presence of metallic sodium or any of the alkali or alkaline earth metals. The initial reaction is carried out at 100 to 150° C., and thereafter the polymerization is effected at a temperature of about 230 to 250° C. for a period of 0.5 to 2 hours (U.S. Patent No. 2,251,519). Still another process for the polymerization of cyclic amides employs alkali metal hydrides as catalysts and effects the polymerization at temperatures above the melting point of the polymer and the preferred temperature is in the range of from about 230 to 260° C. (U.S. Patent No. 2,647,105). Another process for the polymerization of cyclic amides employs a mixed catalyst of alkali metal hydroxide and an alkali metal, or alkali metal amide, or alkali metal hydride, at polymerization temperatures in the range of about 215 to 265° C. (U.S. Patent No. 2,805,214).

The prior art processes in general all require relatively high polymerization temperatures above 200° C. and up to 300° C., are carried out in an inert atmosphere, and do not provide a high conversion to the desired polymer. Thus, for the polymerization system employing ε-caprolactam the equilibrium conditions are such that the final reaction mixture contains of the order of about 90 percent polymer and 10 percent monomer.

The principal object of this invention is to provide an improved process for the polymerization of cyclic amides. Another object of this invention is to provide a process for the polymerization of cyclic amides at temperatures below about 200° C. A further object of this invention is to provide a process for the polymerization of cyclic amides whereby a high conversion to the polyamide is obtained. A still further object of this invention is to provide a process for the polymerization of cyclic amides which can be carried out in the presence of oxygen and still provide a polymer having excellent color. Other objects and advantages of this invention will be apparent to those skilled in the art from the following disclosure.

It has now been found that organomagnesium compounds are effective polymerization catalysts for the preparation of polyamides from cyclic amides at temperatures below 200° C. and provide a high conversion to the polymer in a very short period of time. Furthermore, the polymerization process can be carried out in the presence of oxygen and still obtain a polymer of very good color. In contradistinction thereto the prior art processes are carried out in an inert atmosphere to reduce undesirable color formation in the polymer, e.g. when polymerization mixtures containing sodium catalyst are exposed to air a brown color develops almost immediately. Accordingly, the rapid polymerization of the cyclic amide at relatively low temperatures to obtain a high conversion to the polyamide, which process can be carried out in the presence of air without detrimental color formation, makes the instant process particularly useful for casting operations, i.e. the polymerization can be effected rapidly below the softening point of the polyamide. Thus the monomer-catalyst system can be poured into molds of any desired shape or form and polymerized in place. This process is therefore also particularly suitable for the centrifugal polymerization-casting of objects such as pipe or tubing. The polyamide prepared in the aforesaid manner is characterized by little shrinkage such that the molded object is a substantially exact copy of the original object.

The cyclic amides which are employed in the instant process preferably is the lactam containing 7 members in the lactam ring, i.e. ε-caprolactam, having the structural formula:

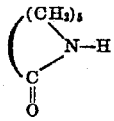

Higher molecular weight cyclic amides can also be employed, e.g. methylcyclohexanone isoximes, cycloheptanone isoxime, cyclooctanone isoxime, and cyclopentadecanone isoxime, and may contain a plurality of amide groups in the ring structure, as for example, cyclic monomeric hexamethylene adipamide, and the like.

The preferred organomagnesium compounds employed as catalysts in the instant process are those prepared by the reaction of a Grignard reagent with the cyclic amide, for example:

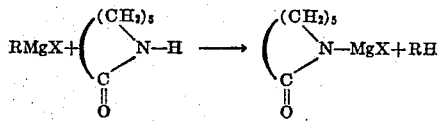

wherein R is a hydrocarbon radical preferably selected such that the hydrocarbon produced in the reaction is readily volatile and can be removed from the monomer-catalyst mixture at temperatures up to 100° C.; and X is a halogen, such as chlorine, bromine or iodine. Thus R can be methyl, ethyl, propyl, butyl, pentyl, hexyl, heptyl, cyclopentyl, cyclohexyl, phenyl and the like. It is not essential that the hydrocarbon be removed by volatilization, accordingly, higher hydrocarbon radicals are also suitable, illustrative examples of which are octyl, decyl, dodecyl, octadecyl, bicyclohexylyl, tetrahydronaphthyl, tolyl, xylyl, mesityl, cumyl, biphenylyl, naphthyl, benzyl, phenethyl, and the like. Thus R can be any alkyl, cycloalkyl, aralkyl, aryl, or alkaryl radical. In general the hydrocarbon radical preferably does not contain over about 20 carbon atoms.

Illustrative organomagnesium halides which are suitable as catalysts for the polymerization of the cyclic amides are for example methylmagnesium bromide, phenylmagnesium bromide, ethylmagnesium iodide, cyclohexylmagnesium bromide, methylmagnesium chloride, butylmagnesium bromide, methylmagnesium iodide, t-butylmagnesium chloride, n-hexylmagnesium bromide, cyclohexylmagnesium chloride, ethylmagnesium bromide, isopropylmagnesium iodide, benzylmagnesium chloride, propylmagnesium bromide, t-butylmagnesium iodide, isoamylmagnesium bromide, ethylmagnesium chloride, benzylmagnesium bromide, isobutylmagnesium bromide, tolylmagnesium bromide, mesitylmagnesium bromide, naphthylmagnesium bromide, n-octadecylmagnesium bromide, triphenylmethylmagnesium bromide, 9-phenanthrylmagnesium bromide, and the like.

Whereas the cyclic amides are preferred, such that the Grignard reagent can be directly added to the monomer, it should be understood that effective catalysts can also be prepared by treating non-cyclic amides with the Grignard reagent.

The Grignard reagent in solution is in the equilibrium $$2RMgX \rightleftharpoons R_2Mg + MgX_2$$

In this equilibrium only the $R_2Mg$ is soluble in dioxane, thus various diaryl, dialkyl, dicycloalkyl, diaralkyl and dialkaryl magnesium compounds can be readily prepared and have also been found to be effective catalysts for the poylymerization of cyclic amides. Illustrative dihydrocarbylmagnesium compounds are dimethylmagnesium, diethylmagnesium, diphenylmagnesium, dicyclohexylmagnesium, dibutylmagnesium, dibenzylmagnesium, ditolylmagnesium, and the like.

Other suitable organomagnesium compounds are the compounls prepared from the reaction of a Grignard reagent with a primary amine:

$$R'NH + RMgX \rightarrow R'NHMgX + RH$$

wherein R' is a hydrocarbon radical of the same scope as R, as defined hereinabove. Also magnesium dust can be directly reacted with two mol equivalents of a primary amine compound to prepare the organomagnesium compounds having the general formula $Mg(NHR'')_2$, wherein R'' is a hydrocarbon radical of the same scope as R. In addition magnesium alcoholates have been found to be catalysts for the polymerization of lactams, but in general require higher temperatures and reaction times than do the aforesaid catalysts, for example magnesium methoxide and magnesium ethoxide required polymerization temperatures of the order of about 160° C. and higher.

In view of the above-stated preference that the hydrocarbon radical of the organomagnesium compound does not contain over about 20 carbon atoms, it is seen that the preferred organomagnesium compounds can have a molecular weight of up to about 600.

Effective amounts of the organomagnesium compounds as catalysts for the polymerization of lactams can be varied from about 0.05 up to about 5 mol percent, based on the lactam, and preferably varies from about 0.1 to about 1 mol percent.

Whereas the organomagnesium compounds can be employed alone with the lactams to effect polymerization thereof, it also has been found that the presence of an N,N-diacyl compound in the polymerization system is beneficial in the rapid polymerization of the lactam at relatively low temperatures. The amount of the N,N-diacyl promoter in the polymerization process can be varied to contain up to about 5 mol percent of the lactam monomer and will preferably vary from about 0.05 to about 2 mol percent, and more preferably still from about 0.1 to about 1 mol percent of the lactam monomer.

The N,N-diacyl compounds suitable as promoters can be selected from the class of compounds containing the essential active group:

wherein N is a tertiary nitrogen atom (i.e., has no hydrogen atoms attached thereto), A is an acyl radical selected from

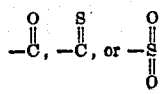

and B is an acyl radical selected from

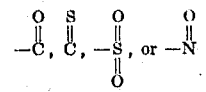

and R is a third substituent of the same kind or general type as A or B; or a hydrocarbyl radical such as aryl, alkyl, aralkyl, alkaryl, cycloalkyl, etc.; or a heterocyclic radical such as pyridyl, quinolyl, etc.; or any of the aforementioned groups substituted with or containing additional radicals or groups such as carbonyl, N-substituted carbamyl, alkoxy, ether, sulfonyl, tertiary amino, etc.; or any other non-interfering groups, i.e., groups which will not preferentially react with the lactam or which will not otherwise interfere with the essential effective activity of the polymerization catalyst.

The substituents attached to the carbonyl, thiocarbonyl and sulfonyl radicals A and B are unlimited, provided they are free from interfering groups. Examples of non-interfering groups are hydrogen atoms, as well as hydrocarbyl and heterocyclic radicals mentioned in the preceding paragraph, including such radicals substituted with or containing polar-substituents such as tertiary amino, acylamido, N-substituted carbamido, ether, etc. The radicals A and B can be attached together to form a ring system (e.g., the cyclic imides described in greater detail below). Likewise, the radical A and the tertiary nitrogen atom can constitute a part of a ring system not including the radical B (e.g., the lactams described below).

A preferred class of materials having the aforementioned structure are N-substituted imides, i.e., compounds of the foregoing type having at least two acyl groups attached directly to the tertiary nitrogen atom. This group of compounds can be represented by the following structural formula:

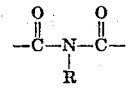

A particularly effective class of N-substituted imides are the N-acyl lactams such as N-acetyl-2-pyrrolidone, N-acetyl-ε-caprolactam, N-benzoyl-ε-caprolactam, N-benzoyl-δ-valerolactam, N-ethylcarbamyl-ε-caprolactam, N-propionyl-ω-caprylolactam, N-toloyl-ω-decanolactam, etc.

Another preferred class of N-substituted imides comprise the cyclic imides of dicarboxylic acids. Examples of this class are N-phenylsuccinimide, N-phenylmaleimide, N-methylsuccinimide, N-methylphthalimide, N-acetyltetrahydrophthalimide, N-benzoylsuccinimide, N-benzoylphthalimide, etc.

Another preferred class of N-substituted imides comprise those having a multiplicity of the essential N,N-diacyl tertiary nitrogen ato mgroups. This class includes compounds in which a portion of the group (for example, an acyl radical) is common to two or more of the essential polymerization promoting structures. Examples of this class are the N,N',N''-trimethylester of isocyanuric acid, N,N'-di(phenylcarbamyl)-N,N'-dimethylureas, ethylene disuccinimide, etc.

Examples of other N-substituted imides suitable for the above-described improved polymerization are N,N-diacetylmethyl-amine, N,N-dibenzoylaniline, triacetamide, N-acetyl-N-formyl ethylamine, N-propionylsaccharin, etc.

Another general class of compounds useful for the polymerization process comprise the N-acyl sulfonamides containing no hydrogen atom on the sulfonamide nitrogen atom. Examples of this general class of materials are N-acetyl-N-ethyl-p-toluene-sulfonamide, N-ethyl-N-lauroylethanesulfonamide, N,N - diacetylmethanesulfonamide, N - (phenylsulfonyl)succinimide, N - methylsaccharin, N-acetylsaccharin, N-acetyl-N-methylbenzenesulfonamide and numerous other N-acyl sulfonamides.

Another class of suitable compounds for the polymerization process comprise the disulfonamides such as N,N-di(p-toluenesulfonyl)anilide, N, N - di(benzenesulfonyl)

methylamine, and other N,N-dibenzenesulfonyl alkylamines, as well as the corresponding N,N - dialkanesulfonylalkylamines such as N,N-di(methanesulfonyl)-ethylamine, etc.

Another general type of effective promoter compounds comprise the N-nitrosoamides. Representative members of this class of compounds are N-nitroso-2-pyrrolidone, N - nitrosuccinimide, N,N - diacetylnitrosamine, N - nitroso - N - acetyl - propylamine, N - nitroso - N,N' - di-n-butylurea, N-methyl-N-nitrosourethane and other N- substituted N-nitroso-carbamates, etc.

Another general class of promoters for the polymerization process comprises the N-nitrososulfonamides, such as N - nitroso - N - methyl - benzenesulfonamide, N - nitroso - N - methyl - p - toluenesulfonamide, N - nitroso - N - ethyl - methanesulfonamide, N - nitroso - N - phenethyl-butanesulfonamide, etc.

As was indicated above, one or more of the acyl oxygen atoms of the various compounds described herein can be substituted with sulfur atoms to form the corresponding thioacyl compounds without destroying the effectiveness of such compounds as promoters for the polymerization of the lactams. Examples of such thio compounds are 1 - acetyl - 2 - thiohydantoin and 3 - butyl - 5,5 - dimethyl - 2 - thio - 2,4 - oxazolidinedione. Other suitable thio analogs of the foregoing acyl compounds are N-thiobenzoyl-2 - pyrrolidone, N - thiopropionylmaleimide, N - phenyldithiosuccinimide, N - (n - octyl - carbamyl) - 2 - thiopyrrolidone, etc.

To preclude the presence of large inert groups being present in the above-described N,N-diacyl promoters it is preferred that the molecular weight of the compound does not exceed about 1000 and more preferably still does not exceed about 500.

The polymerization process can be carried out at temperatures of from about the melting point of the lactam monomer up to about 250° C. Preferably the polymerization temperature is held within the limits of from about 100° C. up to about 200° C. and more preferably still from about 125° C. up to about 170° C. The polymerization time will vary from a few minutes to several hours, as demonstrated hereinbelow, depending on the choice of the catalyst-promoter system, and the temperature of polymerization.

The polymerization can be carried out in a closed system in the presence of an inert atmosphere or in an open system in the presence of air. When an open system is employed it is generally preferred that the polymerization temperature not exceed about 170° C. in order to obtain polymer products which are substantially free from discoloration.

The following examples are illustrative of this invention.

A series of experiments were run wherein the polymerization temperature was carried from 100° to 160° C. as indicated below. One mol of ε-caprolactam was heated to the indicated temperature and 0.005 mol of N-acetyl caprolactam and 0.005 mol of phenylmagnesium bromide in diethyl ether were added thereto with the following results.

| Example | Temperature, °C. | Time, min. | Conversion, percent | Color |
| --- | --- | --- | --- | --- |
| 1 | 100 | 60 | 94.3 | white. |
| 2 | 125 | 15 | 98 | white. |
| 3 | 135 | 15 | 98 | white. |
| 4 | 160 | 15 | 98.4 | pale yellow. |

The reaction times in the above examples are generally longer than is necessary to provide suitable high molecular weight polymers, thus the reaction mixture at 100° C. was a heavy paste after only about 5.5 minutes, at 125° C. the reaction mixture was solidified after about 4.5 minutes, at 135° C. the reaction mixture was solidified after about 3.5 minutes, and at 160° C. the reaction mixture was solidified after about 2 minutes. It will be noted that only a slight coloration was observed at the higher temperature and that all of the polymerization reactions conducted below about 160° C. did not show any discoloration. In contradistinction to the aforesaid procedure employing an organomagnesium catalyst, metallic sodium or sodium hydride immediately gives a yellow color to the monomer-initiator system on addition thereto.

The following examples were run in the same manner as Examples 1 to 4, except that 0.005 mol of methylmagnesium bromide, as a 3-molar solution in butyl ether, was employed in place of the phenylmagnesium bromide with the following results:

| Example | Temperature, °C. | Time, min. | Conversion, percent | Color |
| --- | --- | --- | --- | --- |
| 5 | 130 | 15 | 97.9 | white. |
| 6 | 160 | 17 | 97.9 | pale yellow. |

The reaction mixture was solid in 4 minutes at 130° C. and in 2 minutes at 160° C.

*Example 7.*—In a similar experiment to the above examples, one mol of ε-caprolactam was heated to 100° C. and 0.005 mol of N-acetyl caprolactam and 0.005 mol of sodium hydride were added thereto. The system was maintained for 2 hours at 100° C. after which time it was found that the conversion was only 17.5 percent.

*Example 8.*—A solution of diphenylmagnesium was prepared by adding 10 ml. of 1,4-dioxane to 2 ml. of a 3-molar solution of phenylmagnesium bromide in ether. A voluminous precipitate was found and separated. Then 1.5 ml. of the dioxane solution containing the diphenylmagnesium was added to 20 g. of ε-caprolactam at 160° C. and 0.15 ml. of N-acetyl caprolactam, 0.006 mol per mol of caprolactam, was added thereto. The polymerization of the caprolactam was effected very rapidly and the reaction was a solid polymer within a few minutes.

*Example 9.*—One mol of ε-caprolactam was introduced into a closed reaction vessel and heated to 160° C. under a nitrogen atmosphere. Then 0.005 mol of phenylmagnesium bromide in diethyl ether (a 3-molar solution) was added thereto and mixed with the caprolactam. The temperature was maintained at 160° C. for a period of about 20 hours. The conversion to polymer was found to be about 60 percent.

*Example 10.*—A similar experiment to Example 9 was run except that 0.005 mol of sodium hydride was substituted for the phenylmagnesium bromide catalyst and the system was maintained at 160° C. for 48 hours. It was found that there was no polymerization of the ε-caprolactam at the end of the 48-hour period at 160° C.

*Example 11.*—Another experiment identical to Example 9, except that the temperature of the system was 190° C., was run. The conversion of the ε-caprolactam to polymer was found to be 95.6 percent.

*Example 12.*—Magnesium anilide was prepared by the reaction of 3.52 g. of magnesium dust with 50 ml. of aniline in 80 ml. of a saturated aliphatic hydrocarbon solvent mixture (boiling point range of 180–210° C.) at 160° C. under a nitrogen atmosphere, and the solvent was distilled off at the completion of the reaction. The magnesium anilide was slurried with 100 ml. of molten ε-caprolactam and well mixed therewith. Then this slurry was added to 9944 g. of ε-caprolactam and 41.7 g. of N-acetyl caprolactam added thereto. The reaction mixture was held at about 165° C. for about 12 hours. The polycaprolactam was then cooled and ground through a 3/16" screen in a Cumberland grinder. The conversion was found to be 95.4 percent.

*Example 13.*—An alkylamine-Grignard reagent catalyst was prepared under nitrogen by the reaction of 0.7 ml. of n-hexylamine with 1.7 ml. of ethylmagnesium chloride as a 3-molar solution in diethyl ether. The materials reacted vigorously and the ether and ethane was flashed off. Then 113 g. (1 mol) of ε-caprolactam was heated to 140° C. and added to the n-hexylamine magnesium chloride catalyst to give a water-white solution. Then 0.71 ml. (0.005 mol) of N-acetyl caprolactam was added thereto. The solution became very viscous after about 2 minutes and was a solid after about 5.5 minutes. The reaction vessel was removed from the 140° C. bath 15 minutes after the addition of the N-acetyl caprolactam. The conversion was found to be about 95 percent.

This application is a continuation-in-part of our application Serial No. 599,338, filed July 23, 1956, application Serial No. 627,984 filed December 13, 1956, and application Serial No. 676,419, filed August 5, 1957.

We claim:

1. A process for effecting the polymerization of a lactam containing at least 5 carbon atoms in the ring, in addition to the amide group, comprising heating the lactam under substantially anhydrous conditions at a temperature of from about the melting point thereof up to about 250° C. in admixture with a catalytic amount of from about 0.05 to about 5 mol percent, based on the lactam, of an organomagnesium compound selected from the group consisting of a Grignard reagent, the reaction product of a Grignard reagent with an amide, the reaction product of a Grignard reagent with a hydrocarbyl primary amine, dihydrocarbylaminemagnesium, dihydrocarbylmagnesium compounds, and magnesium alcoholates, said organomagnesium compounds being characterized by a molecular weight up to about 600, and from about 0.05 to about 5 mol percent, based on the lactam, of a nitrogen-containing promoter compound in which the nitrogen atoms are trivalent and in which at least one nitrogen atom is directly attached to at least two radicals selected from the group consisting of carbonyl, thiocarbonyl, sulfonyl, and nitroso radicals and no promoter compound has more than one nitroso radical directly attached to said nitrogen atom, the remaining bonds of said nitrogen atom being attached to a member from the group consisting of said radicals and carbon, the remainder of said promoter compound being composed of organic radicals sufficient to satisfy the remaining available valences and no nitrogen atom in said organic radicals has more than one hydrogen atom attached directly thereto, and said promoter compound is characterized by a molecular weight of up to about 1000.

2. A process for forming shaped articles of the polymerization product of a cyclic amide containing at least 5 carbon atoms in the ring, in addition to the amide group, comprising the steps of charging a mold with said cyclic amide and polymerizing said cyclic amide in situ in said mold, said polymerizing step comprising heating the cyclic amide at a temperature of from about the melting point thereof up to about 250° C. under substantially anhydrous conditions in the presence of a catalytic amount of from about 0.05 to about 5 mol percent, based on the cyclic amide, of an organomagnesium compound and a nitrogen-containing promoter compound of claim 1.

3. A process according to claim 2, in which said mold is rotated about one of its axes during polymerization and the polymerization temperature is maintained below the melting point of the polyamide composition.

4. The process of claim 1, wherein the organomagnesium compound is a Grignard reagent.

5. The process of claim 1, wherein the polymerization temperature is from about 100° C. to about 200° C.

6. The process of claim 15, wherein the polymerization temperature is from about 100° C. to about 200° C.

7. The process of claim 6, wherein the promoter is N-acetyl caprolactam and the catalyst is phenylmagnesium bromide.

8. The process of claim 6, wherein the promoter is N-acetyl caprolactam and the catalyst is methylmagnesium bromide.

9. The process of claim 6, wherein the promoter is N-acetyl caprolactam and the catalyst is n-hexylamine magnesium chloride.

10. The process of claim 6, wherein the promoter is N-acetyl caprolactam and the catalyst is magnesium anilide.

11. The process of claim 6, wherein the promoter is N-acetyl caprolactam and the catalyst is diphenylmagnesium.

12. The process of claim 6, wherein from about 0.1 to about 1 mol percent of catalyst and 0.05 to about 2 mol percent of promoter are employed.

13. The process of claim 12, wherein the promoter is N-acetyl caprolactam and the catalyst is phenylmagnesium bromide.

14. The process of claim 12, wherein the promoter is N-acetyl caprolactam and the catalyst is methylmagnesium bromide.

15. The process of claim 1, wherein the lactam is ε-caprolactam.

16. The process of claim 1, wherein the organomagnesium compound is the reaction product of a Grignard reagent with a hydrocarbyl primary amine.

17. The process of claim 1, wherein the organomagnesium compound is a dihydrocarbylmagnesium compound.

18. The process of claim 2, wherein the cyclic amide is ε-caprolactam and the polymerization temperature is held at from about 125° C. up to about 200° C.

References Cited in the file of this patent

UNITED STATES PATENTS

| | | |
|---|---|---|
| 2,241,322 | Hanford | May 6, 1941 |
| 2,277,152 | Schlack | Mar. 24, 1942 |
| 2,739,959 | Ney et al. | Mar. 27, 1956 |
| 2,849,446 | Sullivan | Aug. 26, 1958 |

FOREIGN PATENTS

| | | |
|---|---|---|
| 68,163 | Norway | July 31, 1944 |
| 52,956 | Netherlands | Aug. 15, 1942 |
| 53,151 | Netherlands | Sept. 15, 1942 |

OTHER REFERENCES

Rochow et al.: "The Chemistry of Organometallic Compounds" (1957), pp. 77–94, Wiley & Sons Inc., N.Y.